United States Patent

Low et al.

[15] 3,697,950

[45] Oct. 10, 1972

[54] VERSATILE ARITHMETIC UNIT FOR HIGH SPEED SEQUENTIAL DECODER

[72] Inventors: George M. Low, Acting Administrator of the National Aeronautics and Space Administration with respect to an invention of; Warren A. Lushbaugh, 5139 Princess Anne Road, La Canada, Calif. 91011; James W. Lyland, 2211 East Washington Street, Pasadena, Calif. 91104

[22] Filed: Feb. 22, 1971

[21] Appl. No.: 117,575

[52] U.S. Cl.................340/146.1 AQ, 340/146.1 AV

[51] Int. Cl.............................................G06f 11/12

[58] Field of Search.........340/146.1, 146.1 AQ, 146.1 AV

[56] References Cited

UNITED STATES PATENTS 3,457,562 7/1969 Fano.......................340/146.1

3,587,042 6/1971 Mitchell.................340/146.1

3,588,819 6/1971 Tong......................340/146.1

3,609,682 9/1971 Mitchell.................340/146.1

*Primary Examiner*—Charles E. Atkinson

*Attorney*—Monte F. Mott, Paul F. McCaul and John R. Manning

[57] ABSTRACT

An arithmetic unit for a decoder for data encoded by convolution encoding. The arithmetic unit includes two channels, a main metric channel and a delta metric channel. In the main metric channel a metric is computed for a received symbol branch with respect to check bits from an encoder replica which is fed with a data bit, assumed to be a zero. The delta metric channel computes a delta metric for the same branch. At the end of the computations the sign of the computed delta metric is used to control the changing of the data bit to a one and the adding of the computed delta metric to the metric in the main metric channel.

11 Claims, 8 Drawing Figures

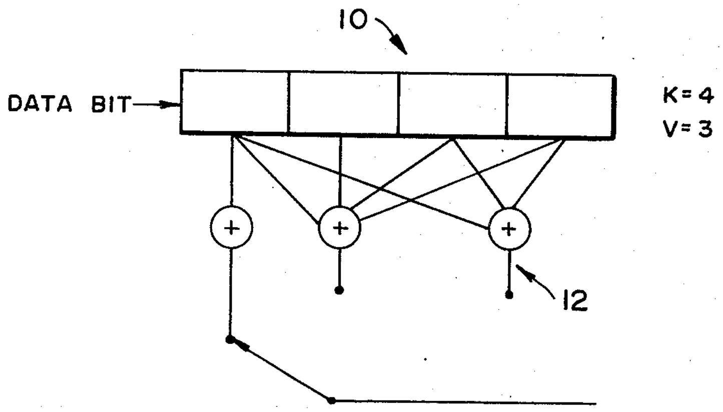
FIG. 1
FIG. 3
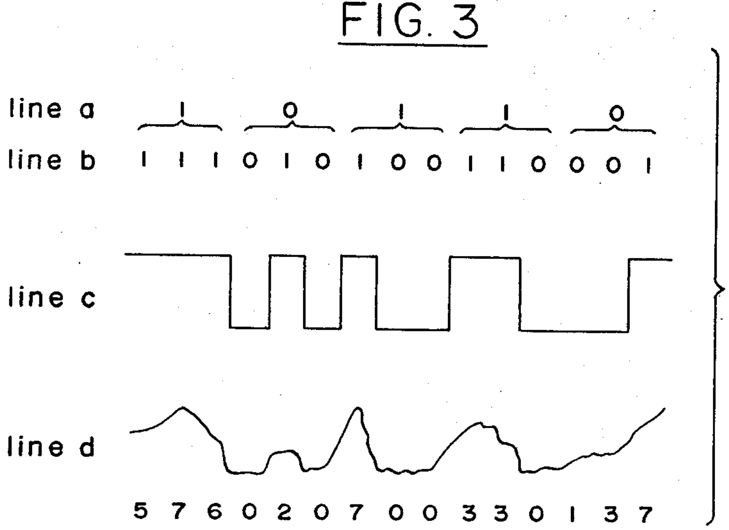
FIG. 5
| QUANTIZED SYMBOL | CHECK BIT 0 | CHECK BIT 1 |
|---|---|---|
| 0 | 0 | -95 |
| 1 | - 1 | -61 |
| 2 | - 4 | -40 |
| 3 | -10 | -22 |
| 4 | -22 | -10 |
| 5 | -40 | -4 |
| 6 | -61 | -1 |
| 7 | -95 | 0 |
| QUANTIZED SYMBOL | Δ Met |
|---|---|
| 0 | + 95 |
| 1 | + 60 |
| 2 | + 36 |
| 3 | + 12 |
| 4 | − 12 |
| 5 | − 36 |
| 6 | − 60 |
| 7 | − 95 |
FIG. 6
INVENTORS
WARREN A. LUSHBAUGH
JAMES W. LAYLAND
BY
[signatures]
ATTORNEYS

WARREN A. LUSHBAUGH
JAMES W. LAYLAND
*INVENTORS*

BY Paul F. McCaul
Monte F. Mott
ATTORNEYS

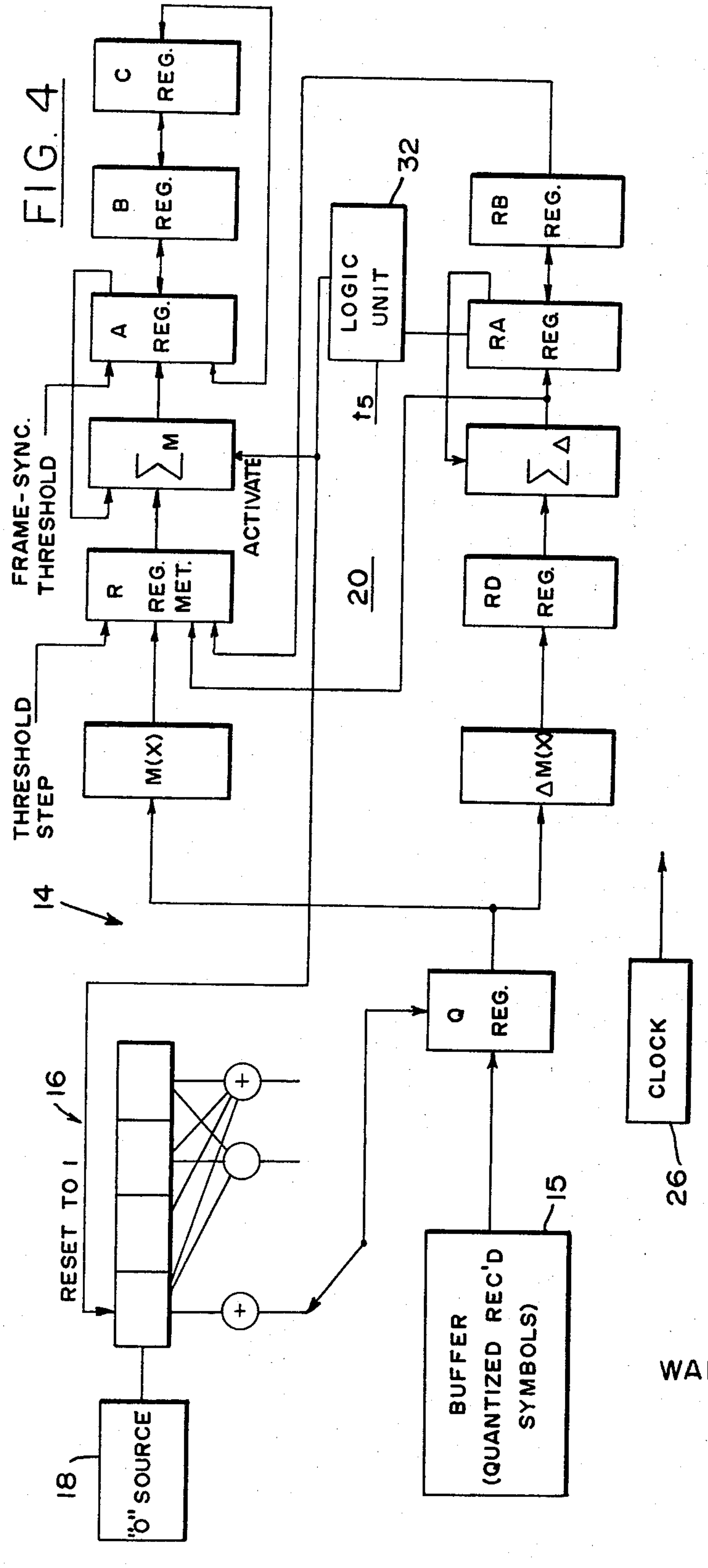
FIG. 4
FIG. 7
| | $t_0$ | $t_1$ | $t_2$ | $t_3$ | $t_4$ | $t_5$ |
|---|---|---|---|---|---|---|
| OUT OF BUFFER 15 | 1 | 4 | 3 | 3 | | |
| Q REG. | | 1 | 3 | 3 | | |
| R | | 32 | −1 | −10 | −10 | 84 |
| A | | $M_p$ | $M_p+32$ | $M_p+31$ | $M_p+21$ | $M_p+11$ |
| B | | $M_{p-1}$ | $M_p$ | | | |
| C | | $M_{p-2}$ | $M_{p-1}$ | | | |
| RD | | | 60 | 12 | 12 | |
| RA | | 0 | 0 | 60 | 72 | 84 |
FIG. 8
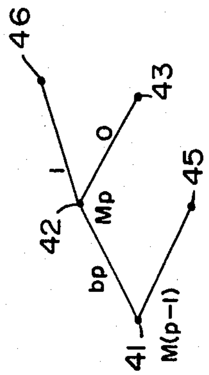
WARREN A. LUSHBAUGH
JAMES W. LAYLAND
INVENTORS
BY [signatures]
ATTORNEYS

VERSATILE ARITHMETIC UNIT FOR HIGH SPEED SEQUENTIAL DECODER

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

1. Field of the Invention

The present invention generally relates to decoding circuitry and, more particularly, to a decoder for sequentially decoding data encoded by convolution encoding.

2. Description of the Prior Art

Convolutional encoding and sequential decoding have been receiving considerable attention for use in spacecraft telemetry systems. The properties of the codes and the decoding algorithm are discussed in detail in "Principles of Communication Engineering" by J. M. Wozencraft and I. M. Jacobs, published in 1965 by John Wiley & Sons, Inc., New York. Until recently most sequential decoding has been performed using general purpose computers which are programmed according to the Fano algorithm. Since the cost of a general purpose computer is high and its use very expensive, a need has existed for a hardware-oriented decoder which could perform the specific tasks of decoding with minimum hardware at reduced cost.

In Space Programs Summary 37-50, Vol. II of Jet Propulsion Laboratory of Pasadena, Calif., published in 1968, a hardware oriented sequential decoder is described on pages 71-78. On page 75 the basic block diagram of the decoder is shown. One of its major units is an arithmetic unit, which is described in further detail in connection with FIG. 36 on page 76. Briefly, a convolutional encoder consists of a K-bit shift register coupled with V parity check adders, each of which is connected to a distinct subset of the bits in the shift register. Typically, the code is systematic and complementary; i.e., one adder receives only the most recent bit, and this bit is connected to all adders. After each data bit is shifted into the register, the V check symbols are sampled in turn and transmitted. These V symbols form one branch of the tree code which is generated. To synchronize and block the data, a known sequence, sometimes referred to as a tail, is encoded and transmitted following each L-bit block of data. This sequence, or optionally, an all zero sequence, is the initial state for the encoding of the next L-bit block of data.

The decoder for this code consists of a buffer to hold received symbols, a copy of the encoder, and equipment to measure the merit of the output of this encoder relative to the received symbol sequence. This metric is used sequentially and systematically to estimate and/or correct the local data sequence. The metric is computed branch-by-branch and compared to a threshold. Whenever a threshold violation occurs, the local data sequence is searched backwards for a probable cause and then corrected. The estimation and backward searching are controlled according to the Fano algorithm in such a way that no looping is possible; i.e., given enough time and very unfavorable circumstances, all $2^L$ possible local data sequences could be examined by the decoder.

The arithmetic unit shown on page 76 of the aforementioned article includes four channels. The top channel is used in the computation of each forward branch for a local data bit which is a 0, and the next channel is used in the computation for a local data bit which is a 1. Then based on the comparison of the two metrics so computed, a decision is made in the selection of the local data bit in the copy of the encoder in the decoder. The four computations which are performed for each forward branch in the arithmetic unit are listed as equations (1)-(4) on page 71. Although the decoder described therein is feasible, it has been determined that the arithmetic unit is unnecessarily complex and that the desired decoding can be accomplished with a simpler arithmetic unit and one which is essentially equal in speed to the unit herebefore described.

OBJECTS AND SUMMARY OF THE INVENTION

It is a primary object of the present invention to provide a new improved convolutional sequential decoder.

Another object is to provide a convolutional sequential decoder with a new arithmetic unit.

A further object is to provide a convolutional sequential decoder with an arithmetic unit which is simpler than one forming part of the prior art.

These and other objects of the invention are achieved by providing an arithmetic unit with only two channels, hereafter defined as the main metric channel and the delta metric channel. The basic functions performed by the arithmetic unit are:

1. correlate the received symbols against the prediction of the local coder of the decoder;
2. look up an associated metric, M(x); and
3. add this value to a running metric, Mp.

Since there are V symbols per branch, which must be treated exactly the same, a "pipeline" type design is employed. As will be explained later, each symbol spends three clock periods in transit. By enabling as many as three symbols to undergo some type of processing at any one time, a high rate of computation with a minimum of hardware is realized.

In the present invention the main channel is used for symbol processing assuming the data bit is a 0. The delta metric channel on the other hand is used for processing each symbol with a delta metric table. The sum of the delta-metric term for the V symbols for each branch gives a delta metric value for the branch. After all the symbols of a branch are processed, the sign of the delta metric is used to determine the best bit for the branch, without the need to process each symbol with respect to a 1 data bit.

The novel features of the invention are set forth with particularity in the appended claims. The invention will best be understood from the following description when read in conjunction with the accompanying drawings.

BRIEF DESCRIPTION OF THE DRAWINGS

FIG. 1 is a block diagram of an encoder for data to be encoded by convolutional encoding;

FIG. 3 is a multiline waveform diagram useful in explaining the present invention;

FIG. 4 is a basic block diagram of the present invention;

FIGS. 5-7 are charts useful in explaining the operation of the circuitry, shown in FIG. 4; and FIG. 8 is a simple diagram of several branches useful in explaining the function of several registers shown in FIG. 4.

DESCRIPTION OF THE PREFERRED EMBODIMENTS

Figure 2:
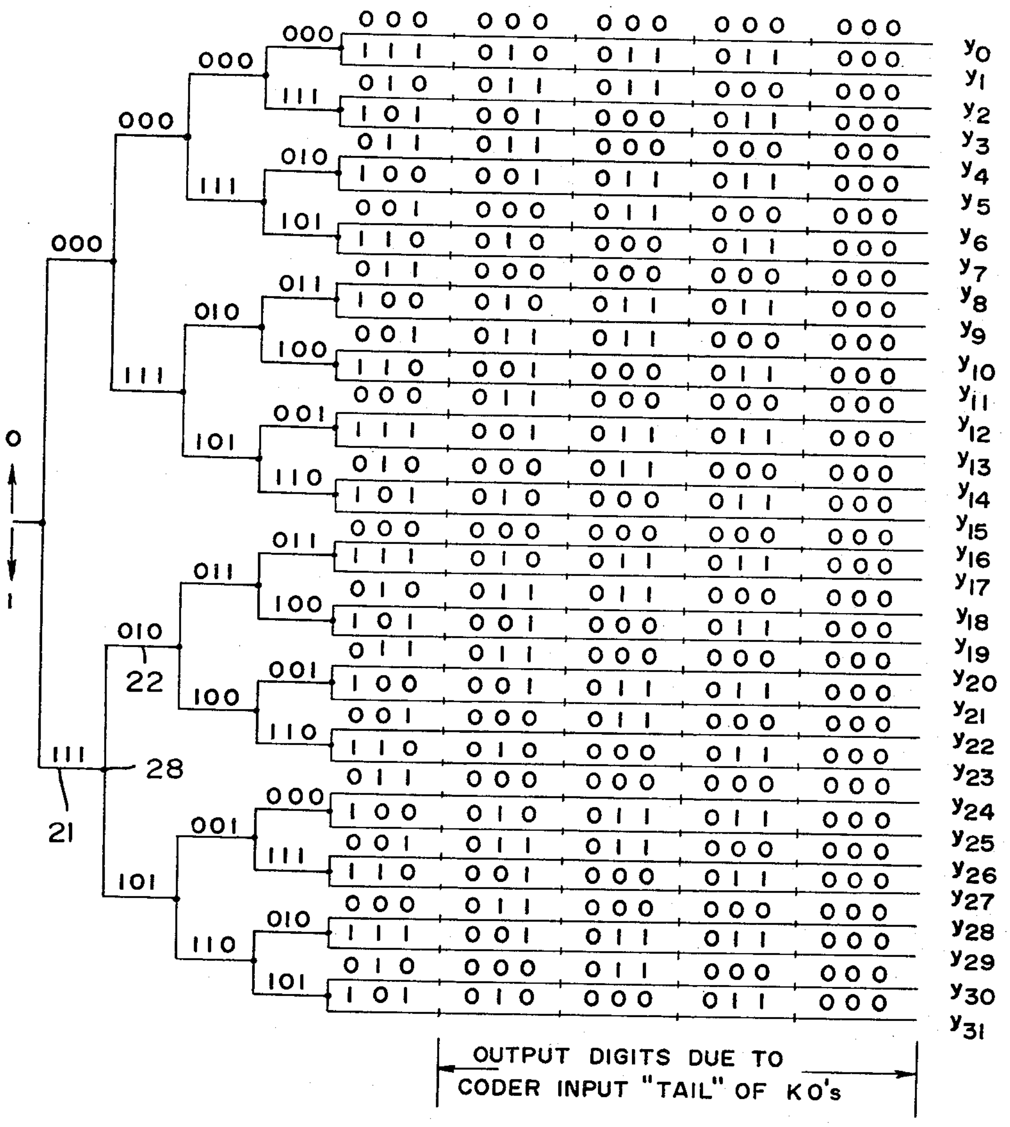
FIG. 2 is a code tree output of the encoder shown in FIG. 1.

Attention is briefly directed to FIG. 1 which represents a convolutional encoder comprising a K stage shift register 10 and V modulo-2 adders 12. In the particular example $K=4$ and $V=3$. Such an encoder is assumed to encode a stream of data bits and a replica or copy of such an encoder forms part of the decoder. A code tree output of such an encoder for 5 bits ($L=5$) followed by all 0's is shown in FIG. 2. In FIG. 3 line *a* displays a stream of original bits, which after encoding are represented by symbols as shown in line *b*. Line c represents an idealized transmitted waveform of the symbols and line d represents a noise-modified waveform which is received and which has to be decoded. Each symbol is assumed to be quantized between 0 and 7 and the quantized symbols are assumed to be stored in a buffer 15, which forms part of the decoder 14 (FIG. 4). The decoder is also shown including a coder 16 which is a copy or replica of the encoder shown in FIG. 1. When a block of data is to be decoded, the coder 16 is set to the appropriate initial state. The V (3) check symbols from the coder 16 form one branch of the tree code. Each received symbol sequence is correlated relative to the quantized symbols in buffer 15. This is used sequentially and systematically to estimate and/or correct the local data sequence which is provided by the local coder.

In the present invention in operation the input stage of the local coder 16 is reset to a 0 state by unit 18 at the beginning of each major measurement cycle. That is, the local data bit is assumed to be a 0. Then, based on the measurements performed on the complete symbol branch, the state of the first stage of coder 16 remains as originally reset, i.e., a 0 or is set to a 1 state. All the measurements are performed by an arithmetic unit 20, whose general operation may best be described in conjunction with a specific example.

Let it be assumed that out of a block of data the first data bit was determined to be a 1. Thus, after this determination, the coder output is 111 as represented by branch 21 in FIG. 2. Since in the present invention the encoder input is set to a 0, the encoder's output is 010 as represented by branch 22 in FIG. 2. Assuming that the quantized symbols are 143, the arithmetic unit correlates these quantized symbols with respect to 010 to estimate whether they represent a 0 in which case the coder input is not disturbed or whether they should represent a 1 in which case the coder's input stage is set to a 1.

The arithmetic unit includes a metric look-up table, which in one embodiment has the values shown in FIG. 5. For each branch of received symbols, a metric is computed based on the expected branch. In the particular example of a received symbol branch of 143 and an expected branch of 010, the computed metric is $(+32)+(-1)+(-10)+(-10)=+11$, where a threshold metric value of +32 is added to all the computed metrics. In this particular embodiment this threshold metric value of +32 represents the maximum uphill climb of a branch and is also equal to the backtrack threshold of the Fano algorithm. To simplify the metric look-up, the complement of the received symbol to the base 7 is used whenever the check bit from the encoder is a 1. Thus, in the example 143 when the expected branch is 010, it is converted to 133 and only the metric values for a check bit of 0 are used.

In addition, the arithmetic unit includes a delta metric (ΔMet) look-up table which is the difference between the 0 and the 1 metric tables, the delta metric table for the particular example is shown in FIG. 6. For the particular example of 133, the accumulated delta metric is $(+60)+(+12)+(+12)=+84$. In accordance with the present invention, whenever the delta metric has a positive sign, as in the present example, the data bit is assumed to be 0 and therefore no correction is made in the state of the coder's input stage. If, however, the sign of the delta metric is negative, the input stage is set to a 1. For example, assuming the same expected branch of 010 and a received symbol branch of 756, the metric and the delta metric would have values of $$(-95)+(-4)+(-61)+32=-128 \text{ and}$$

$$(-95)+(-36)+(-60)=-191.$$

Thus, since the delta metric has a negative sign, the input stage would be set to a 1. The main metric value is correspondingly and simultaneously set to $$(-128)-(-191)=+63.$$

Attention is again directed to FIG. 4 which includes a block diagram of the novel arithmetic unit 20, and of other related units which are needed to explain its operation. Briefly, all the quantized received symbols are stored in a buffer 15 which is connected to a Q register of arithmetic unit 20 which operates serially on each received quantized symbol. The arithmetic unit is under the control of a clock 26 whose clock pulses control the operation of the unit 20 as will be described. During the first clock pulse $t_1$, the first quantized symbol is transferred to the Q register from buffer 15. It is loaded if the check bit from coder 16 is a 0. Otherwise, its complement (to the base 7) is loaded. During this clock pulse, the threshold metric value, e.g., +32, is loaded in an R register.

One clock pulse later, during $t_2$, a read only memory (ROM) M(x) in which the metric look-up table, such as that shown in FIG. 5, is interrogated and is read out into the R register, while the content of the R register is added by an adder $\Sigma_M$ to the content of an A register. At the beginning of the cycle, the A register holds a metric value $M_P$ corresponding to the node of the present position of the code tree, such as the node designated by 28 in FIG. 2, while at the end of the cycle the A register holds the metric value of the next node. For the particular example of received symbols 143 and an expected branch of 010, the contents of the output end of the buffer 15, the Q, R and A registers is as shown in FIG. 7. It is thus seen that while each symbol spends 3 clock periods in transit there can be as many as three symbols undergoing some type of processing at any one time. This results in a relatively high rate of computation while using a minimum of hardware. The (ROM) M(x), adder $\Sigma_M$ and the R and A registers comprise a main metric channel in which the metric for the branch is computed assuming the local data bit is a 0.

The arithmetic unit 20 also includes a delta metric channel consisting of a (ROM) $\Delta M(x)$, an RD register, an adder $\Sigma$ and an RA register. Therein, the symbols are processed sequentially so that at the end of the cycle, the delta metric and its sign are stored in the RA register. $\Delta M(x)$ stores the delta metric table shown in FIG. 6. Thus as the running metric is computed for each symbol in the main metric channel, a delta metric is computed in the delta metric channel. The contents of the registers RD and RA during the various cycle periods are also shown in FIG. 7.

As seen from FIG. 7, during $t_5$ the main branch metric is loaded in register A and the delta metric for the entire branch is loaded in the RA register from the adder $\Sigma$. This adder is connected to the R register so that while the RA register is loaded with the computed delta metric, the same delta metric is loaded in the R register. If the sign of the delta metric is negative, the content of the R register is subtracted from the A register and the input stage of the decoder 15 is set to a 1. It should be stressed that the transfer of the delta metric from $\Sigma_\Delta$ to R is always performed at the appropriate time in the cycle, which in FIG. 7 is assumed to be during $t_5$. However, the subsequent addition of the R and A registers is done on an asynchronous basis; i.e., only when the best bit is a 1 which is indicated when the delta metric has a negative sign. For explanatory purposes, the checking of the sign of the delta metric is shown performed by a logic unit 32, which is clocked at the appropriate time, $t_5$ in the present example. If the sign is negative, unit 32 causes the timing control unit to add an extra timing pulse allowing time to subtract the content of the R register from the A register and to set the first stage of the coder 15.

As seen from FIG. 4, the arithmetic unit 20 further includes B and C registers, in the main metric channel and an RB register in the delta metric channel. These registers are used to hold values from previous nodes and are changed only once per major cycle. The B register holds the metric value $M_P$ for the present node in the tree, while the C registers stores $M_{P-1}$ which is the metric value of a previous node. The RB register stores the delta metric for the $p^{th}$ or present node. This register in conjunction with the B register facilitate the sideways step operation which is required by the Fano algorithm.

The foregoing description may be summarized in connection with FIG. 8 wherein numerals 42 and 41 represent the present node and a previous node with the two having running metric values of $M_P$ and $M_{P-1}$ respectively. These are held in the B and C registers respectively. Computations are performed in the main metric channel for the forward node with the best bit assumed to be a 0. This node is designated by 43. In the delta metric channel, the delta metric $\Delta_{(p+1)}$ is computed, and if its sign is negative the best bit is set to a 1 and the forward node, designated by numeral 46, is selected as the forward node. Also, the delta metric $\Delta_P$ for the present node is available in the RB register so that if, based on the Fano algorithm, the decoding has to move backward, $\Delta_P$ in the RB register and the metric value $M_P$ in the B register are available to compute the worst branch from node 41 to the node designated by numeral 45.

From the foregoing it is thus seen that in accordance with the teachings of the present invention a new arithmetic unit is provided for a decoder for sequentially decoding data encoded by convolution encoding. The arithmetic unit includes only two channels, one a main metric channel and the other a delta metric channel. In the main metric channel a received symbol branch is correlated with an expected branch of check bits to provide a metric value for a forward node in the Fano algorithm. The expected branch of check bits is formed assuming the data bit to be a 0. At the same time a delta metric is generated in the delta metric channel. At the end of the branch computation the sign of the delta metric is used to determine whether or not the assumed data bit should be set to a 1 and the delta metric subtracted from the metric value derived in the main metric channel.

Although particular embodiments of the invention have been described as illustrated herein, it is recognized that modifications and variations may readily occur to those skilled in the art and consequently it is intended that the claims be interpreted to cover such modifications and equivalents.

What is claimed is:

1. In a decoder for convolutional coded data in which each bit of data is coded by V symbols, the arrangement comprising:

a local multistage encoder for sequentially providing V check symbols;

first means responsive to said sequentially provided V check symbols and to V quantized coded symbols supplied thereto, for providing a sequence of values;

second means for accumulating a metric value as a function of the values provided by said first means;

third means for developing a delta metric value as a function of the values provided by said first means; and fourth means for controlling the metric value accumulated by said second means and the state of a first stage of said local encoder as a function of the sign of the delta metric developed by said third means.

2. The arrangement as recited in claim 1 wherein each check symbol is either of a first value or a second value, each quantized coded symbol is one of $n$ quantized values and said first means provides a value which is a function of the quantized value of the coded symbol and the value of the check symbol.

3. The arrangement as recited in claim 2 wherein said second means includes first storing means for storing a plurality of metric values, and for providing one of said metric values related to the value provided by said first means, said second means further including a first metric register coupled to said first storing means for temporarily storing the value received therefrom, a second metric register and an adder coupled to said first and second metric registers for adding the value temporarily stored in said first metric register to a value stored in said second metric register.

4. The arrangement as recited in claim 2 wherein said third means includes second storing means for storing a plurality of delta metric values and for providing as an output one of said delta metric values related to the value provided by said first means, said third means further including a first delta metric register coupled to said second storing means for temporarily storing the value received therefrom, a second delta metric register and an adder coupled to said first and second delta metric registers for adding the value temporarily stored in said first delta metric register to the value in said second delta metric register.

5. The arrangement as recited in claim 4 wherein each check symbol is either of a first value or a second value, each coded symbol is one of *n* quantized values and said first means provides a value which is a function of the quantized value of the coded symbol and the value of the check symbol.

6. The arrangement as recited in claim 5 wherein said fourth means connecting said adder of said third means and the second delta metric register to said first metric register for transferring the delta metric value in said second delta metric register to said first metric register and logic means coupled to said second delta metric register and to said second means adder for sensing the sign of the delta metric value in said second delta metric register and for activating, as a function of the value sign, said second means adder to add the value in said first metric register to the value in said second metric register.

7. The arrangement as recited in claim 6 wherein said fourth means further include means for connecting said logic means to the first stage of said local encoder to control the state thereof as a function of the sign sensed by said logic means.

8. A system for decoding data bits encoded by convolutional coding, comprising:

a local multistage encoder for sequentially providing V check symbols;

buffer means for storing data bits, each in the form of V quantized symbols;

first means coupled to said local encoder and to said buffer means for providing a symbol value as a function of each quantized symbol and a check symbol supplied thereto;

metric channel means coupled to said first means for accumulating a metric value as a function of V symbol values received from said first means;

delta metric channel means coupled to said first means for providing a delta metric value as a function of V symbol values received from said first means;

clock means coupled to said local encoder to said first means, to said metric channel means and to said delta metric channel means for controlling the sequential provision of said V check symbols, the sequential provision of said symbol values and the accumulation of said metric values and said delta metric values during a succession of V clock periods; and control means coupled to said clock means, to said metric channel means and to said delta metric channel means for controlling at the end of said V clock periods the metric value in said metric channel means as a function of the sign of the delta metric value accumulated in said delta metric channel means.

9. The arrangement as recited in claim 8 wherein said control means further include means for changing the state of the first stage of said local encoder whenever the metric value is affected as a result of the sign of the delta metric value.

10. The arrangement as recited in claim 8 wherein said control means includes means for transferring the delta metric value to said metric channel means during the $V^{th}$ clock period and for adding said delta metric value to the metric value during a clock period following the $V^{th}$ clock period only if said delta metric value has a preselected sign.

11. The arrangement as recited in claim 10 wherein said control means further includes means coupled to the first stage of said local encoder for changing the state thereof whenever, during the clock period following said $V^{th}$ clock period, said delta metric value has said preselected sign.

* * * * *